(12) United States Patent
Ehrlich (10) Patent No.: US 10,465,810 B2
(45) Date of Patent: Nov. 5, 2019

(54) INTEGRATED TIRE INFLATION VALVE (71) Applicant: WABASH NATIONAL, L.P., Lafayette, IN (US)

(72) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 129 days.

(21) Appl. No.: 15/716,877

(22) Filed: Sep. 27, 2017

(65) Prior Publication Data

US 2018/0087681 A1 Mar. 29, 2018

Related U.S. Application Data (60) Provisional application No. 62/400,167, filed on Sep. 27, 2016.

(51) Int. Cl.
| | |
|---|---|
| *F16K 15/20* | (2006.01) |
| *F16K 17/04* | (2006.01) |
| *B60C 23/00* | (2006.01) |
| *B01D 46/00* | (2006.01) |
| *G05D 16/06* | (2006.01) |
| *B60C 23/04* | (2006.01) |
| *F16K 15/18* | (2006.01) |

(52) U.S. Cl.
CPC ........ *F16K 17/048* (2013.01); *B01D 46/0005* (2013.01); *B01D 46/0031* (2013.01); *B60C 23/003* (2013.01); *B60C 23/009* (2013.01); *B60C 23/0406* (2013.01); *F16K 17/0406* (2013.01); *G05D 16/0663* (2013.01); *G05D 16/0672* (2013.01); *F16K 15/188* (2013.01); *F16K 15/207* (2013.01); *Y10T 137/3584* (2015.04); *Y10T 137/87917* (2015.04)

(58) Field of Classification Search
CPC ................. F16K 15/188; F16K 15/207; Y10T 137/3584; Y10T 137/36; Y10T 137/87724; Y10T 137/87917
USPC .................................................. 152/415, 416
See application file for complete search history.

(56) References Cited

U.S. PATENT DOCUMENTS

| | | | | |
|---|---|---|---|---|
| 1,458,928 | A | * 6/1923 | Fancher | ................. G05D 16/10 137/613 |
| 1,818,178 | A | * 8/1931 | Weisberg | ................ B60S 5/043 137/224 |
| 2,317,636 | A | 4/1943 | Parker | |
| 4,311,985 | A | 1/1982 | Gee et al. | |
| 4,387,931 | A | 6/1983 | Bland | |
| 4,734,674 | A | 3/1988 | Thomas et al. | |

(Continued)

*Primary Examiner* — Robert K Arundale
(74) *Attorney, Agent, or Firm* — Quarles & Brady LLP (57) ABSTRACT

An integrated tire inflation valve comprises an inlet configured to receive air from an air tank, a pressure protection assembly configured to control air flow into the tire inflation system when an air pressure reaches a pre-set pressure level, a valve assembly in fluid communication with the pressure protection assembly, a pressure regulator configured to be adjusted to a desired pressure to thereby allow air through the pressure regulator at a desired level, a flow switch configured to selectively allow air therethrough, and an outlet configured to provide air from the flow switch to one or more tires of a vehicle. The inlet, pressure protection assembly, valve assembly, pressure regulator, flow switch, and outlet are all positioned within a single housing.

20 Claims, 4 Drawing Sheets

(56) References Cited

U.S. PATENT DOCUMENTS

| | | |
|---|---|---|
| 5,083,457 A | 1/1992 | Schultz |
| 5,483,826 A | 1/1996 | Schultz et al. |
| 5,618,361 A | 4/1997 | Colussi et al. |
| 5,637,926 A | 6/1997 | Zedonis |
| 6,087,930 A | 7/2000 | Kulka et al. |
| 6,175,302 B1 | 1/2001 | Huang |
| 6,229,434 B1 | 5/2001 | Knapp et al. |
| 6,278,363 B1 | 8/2001 | Bezek et al. |
| 6,401,743 B1 * | 6/2002 | Naedler ............... B60C 23/003 137/224 |
| 6,535,116 B1 | 3/2003 | Zhou |
| 6,604,415 B2 | 8/2003 | Imao et al. |
| 6,662,642 B2 | 12/2003 | Breed et al. |
| 6,668,636 B2 | 12/2003 | Nantz et al. |
| 6,691,567 B2 | 2/2004 | Walker et al. |
| 6,705,152 B2 | 3/2004 | Routkevitch et al. |
| 6,725,712 B1 | 4/2004 | King et al. |
| 6,774,778 B2 | 8/2004 | Lin |
| 6,813,940 B2 | 11/2004 | Lin |
| 6,838,985 B2 | 1/2005 | Ghabra et al. |
| 6,864,803 B2 | 3/2005 | Tang et al. |
| 6,868,358 B2 | 3/2005 | Brown, Jr. |
| 6,941,803 B2 | 9/2005 | Hirohama et al. |
| 6,945,103 B1 | 9/2005 | Lee et al. |
| 6,960,994 B2 | 11/2005 | Tabata et al. |
| 6,975,215 B2 | 12/2005 | Schofield et al. |
| 6,985,076 B1 | 1/2006 | Bennie et al. |
| 7,385,485 B2 | 6/2008 | Thomas et al. |
| 7,530,379 B1 | 5/2009 | Becker et al. |
| 7,669,465 B2 | 3/2010 | Becker |
| 7,975,739 B1 | 7/2011 | Ingram |
| 8,245,746 B2 | 8/2012 | Stanczak |
| 8,479,791 B2 | 7/2013 | Schulte et al. |
| 9,387,731 B2 | 7/2016 | Kranz |
| 2006/0180214 A1 * | 8/2006 | Arentsen ............... F16K 15/188 137/613 |
| 2007/0194896 A1 | 8/2007 | Ehrlich et al. |
| 2007/0257785 A1 | 11/2007 | Oboza |
| 2009/0235999 A1 * | 9/2009 | Engelbrecht ........ F16K 11/0873 137/625.46 |
| 2010/0024939 A1 * | 2/2010 | Kusunoki ............. B60C 23/003 152/416 |
| 2017/0158001 A1 * | 6/2017 | Li ........................... G01L 17/00 |
| 2017/0349009 A1 | 12/2017 | Ehrlich |

\* cited by examiner

INTEGRATED TIRE INFLATION VALVE

CROSS-REFERENCE TO RELATED APPLICATIONS

This application claims the benefit of U.S. Provisional Application Ser. No. 62/400,167, filed on Sep. 27, 2016, and entitled "Integrated Tire Inflation Valve," the disclosure of which is hereby incorporated by reference in its entirety.

FIELD OF THE INVENTION

The present invention relates generally to a tire inflation valve, and more particularly, to an integrated tire inflation valve for vehicles to manage tire pressure.

BACKGROUND

Tire inflation systems are used in vehicles to manage the pressure in a number of tires. Tire inflation systems are used in semi-trailers due to the various conditions semi-trailers can encounter. Such conditions can include changes in load in the trailer, changes in environmental conditions, damage to one or more tires, and other variations.

Tire inflation systems allow for adjustments to be made in response to the different conditions that can be encountered by a semi-trailer. Current tire inflation systems incorporate various separate components that may be spread out at different locations on the trailer. Having the components spread out creates difficulties for the installation and maintenance of such tire inflation systems. The components in this case can also be at increased risk of damage due to insufficient protection of all components and connections.

Accordingly, there remains a need for further contributions in this area of technology, including contributions that reduce complexity and increase protection of components.

SUMMARY

The present disclosure may comprise one or more of the following features recited in the attached claims and combinations thereof, and/or one or more of the following features and combination thereof.

In some embodiments of the present disclosure, an integrated tire inflation valve is provided. The integrated tire inflation valve can contain components within a singular housing. The singular housing can allow for ease of installation as well as reduce the risk of damage to components in the integrated tire inflation valve.

In some embodiments of the disclosure, an integrated tire inflation valve is disclosed. The integrated tire inflation valve can comprise an air source and a housing. The housing can contain an inlet, a pressure protection assembly, a valve assembly, a pressure regulator, a flow switch, and an outlet. Further embodiments, forms, features, aspects, benefits, and advantages of the present application shall become apparent from the description and figures provided herewith.

In some embodiments, an integrated tire inflation valve may comprise an inlet that may be configured to receive air from an air reservoir or tank. The integrated tire inflation valve may further comprise a pressure protection assembly that may be configured to control air flow into the integrated tire inflation valve when an air pressure reaches a pre-set pressure level. The integrated tire inflation valve may comprise a valve assembly in fluid communication with the pressure protection assembly. The valve assembly may have open and closed positions. The integrated tire inflation valve may comprise a pressure regulator that may be configured to be adjusted to a desired pressure to thereby allow air through the pressure regulator at a desired level. The integrated tire inflation valve may comprise a flow switch configured to selectively allow air therethrough and an outlet that may be configured to provide air from the flow switch to one or more tires of a vehicle. The inlet, pressure protection assembly, valve assembly, pressure regulator, flow switch, and outlet all may be positioned within a single housing.

In some embodiments, the pressure protection assembly may include at least one spring that allows for selective engagement of a valve seat against a ledge forming a port. The pressure protection assembly may remain in closed position when a pressure through the inlet is insufficient to overcome a force applied to the seat by the spring. The pressure protection assembly may move to an open position when a pressure of the air through the inlet is sufficient to overcome a force applied to the valve seat by the spring, thereby disengaging the valve seat from the ledge and opening the port.

In some embodiments, the pressure protection assembly may be configured to isolate the integrated tire inflation valve from other pneumatic-based vehicle systems. In other embodiments, the valve assembly may be a ball valve. In other embodiments, the pressure regulator may be configured to regulate the pressure desired to pass through the integrated tire inflation valve.

In some embodiments, the integrated tire inflation valve may include a filter assembly positioned between the inlet and the pressure protection assembly, the filter assembly comprising a filter positioned in a cavity within the single housing, the filter configured to remove contaminants and moisture from air flowing through the cavity.

In some embodiments, the flow switch may be configured to allow pneumatic communication between the integrated tire inflation valve and one or more tires through the outlet. In some embodiments, a metallic plate of the flow switch may be configured to contact contacts of the flow switch to provide an electrical connection therebetween.

In some embodiments, a relief opening may be positioned between the pressure regulator and the flow switch, wherein the relief opening may be configured to relieve pressure in the integrated tire inflation valve.

In some embodiments, an auxiliary opening may be positioned between the pressure protection assembly and the valve assembly to allow fluid communication with other vehicle systems.

In some embodiments, the flow switch may comprise a diaphragm sandwiched between a cover and the housing, at least one contact molded into the cover, and a lead extending from the at least one contact.

In some embodiments, a flow switch may comprise a metal plate positioned adjacent the diaphragm on a side of the diaphragm facing the cover and a spring positioned between the metal plate and the cover to bias the metal plate and the diaphragm and the cover, wherein the metal plate may be selectively engaged with the at least one contact when an air pressure within the flow switch overcomes a bias of the spring.

In some embodiments, the at least one contact may be molded within a cavity in the cover, the lead is attached to the contact, and the cavity is filled with epoxy to retain the lead in engagement with the at least one contact and isolate the contact.

In some embodiments, the flow switch may comprise a diaphragm sandwiched between a cover and the housing, two contacts molded into the cover, and a lead extending from each of the two contacts.

In some embodiments of the present disclosure, an integrated tire inflation valve includes an inlet configured to receive air from an air reservoir, a pressure protection assembly configured to allow air into the integrated tire inflation valve when an air pressure reaches a pre-set pressure level, a pressure regulator configured to be adjusted to a desired pressure to thereby allow air through the pressure regulator at a desired level, a flow switch configured to selectively allow air therethrough, and an outlet configured to provide air from the flow switch to one or more tires of a vehicle, wherein the inlet, pressure protection assembly, pressure regulator, flow switch, and the outlet are positioned within a housing and wherein the flow switch includes a diaphragm sandwiched between a cover and the housing, the cover being made of a non-conductive material, at least one contact molded into the cover, and a lead extending from the at least one contact.

In some embodiments, a filter assembly is positioned between the inlet and the pressure protection assembly, the filter assembly comprising a filter positioned in a cavity within the single housing, the filter configured to remove contaminants and moisture from air flowing through the cavity.

In some embodiments, the inlet, the filter assembly the pressure protection assembly, the pressure regulator, the flow switch, and the outlet are all positioned within a single housing.

In some embodiments, the integrated tire inflation valve further includes a drain in fluid communication with the cavity, wherein the drain is configured to release moisture that has been collected by the filter.

In some embodiments, the integrated tire inflation valves disclosed herein may simplify installation onto a trailer and simplify the assembly of the integrated tire inflation valve. The integrated tire inflation valve can incorporate the functional components into a singular housing. The integrated tire inflation valve can also incorporate a pressure protection assembly that can include a checking assembly or a non-checking assembly. The pressure protection assembly may be configured to protect the air braking system from failure in auxiliary air systems. The flow switch can be built with one or more sealed leads extending therefrom which can allow connection of electrical connectors. A non-limiting example of electrical connectors may include the AMP 2 pin which is commonly used in trailer lighting.

In some embodiments, the pressure protection assembly may be desirable if features are added to an air braking system. The pressure protection assembly can also provide a pressure protected port for supplying air to additional air systems. A non-limiting example of an additional air system could be an air suspension system. In some embodiments, electrical components of the flow switch can be sealed and isolated, which can eliminate the need for an additional enclosure box and mounting plate, as seen in current tire inflation systems. The integrated tire inflation valve may also eliminate a number of pneumatic connectors required to assemble current tire inflation systems. The elimination of a number of pneumatic connectors can reduce the risk of leakage in the overall tire inflation system.

In some embodiments, multiple components of an integrated tire inflation valve can be built into a single housing. Non-limiting examples of the housing can be a casting or a block of metal. The flow switch can be placed in a non-conducting plastic. The contacts can be molded into a plastic housing and the leads can be sealed to prevent corrosion. This can eliminate the need for a protective box used in current tire inflation systems.

These and other features of the present disclosure will become more apparent from the following description of the illustrative embodiments.

Corresponding reference characters indicate corresponding parts throughout the several views. Although the drawings represent embodiments of the present disclosure, the drawings are not necessarily to scale and certain features may be exaggerated in order to better illustrate and explain the embodiments of the present disclosure.

DETAILED DESCRIPTION OF THE DRAWINGS

For the purposes of promoting an understanding of the principles of the present disclosure, reference will now be made to a number of illustrative embodiments shown in the attached drawings and specific language will be used to describe the same. While the concepts of this disclosure are described in relation to an integrated tire inflation valve for use in a semi-truck vehicle or a semi-truck vehicle trailer, it will be understood that it is equally applicable to other trailers and vehicles.

Figure 4:
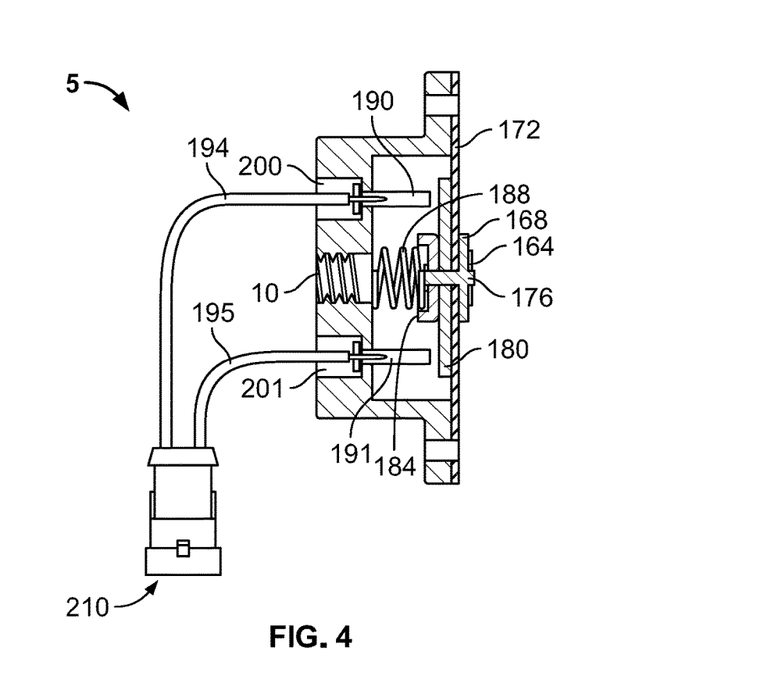
FIG. 4 is a cross-sectional view of one embodiment of a flow switch of an integrated tire inflation valve.
Figure 5:
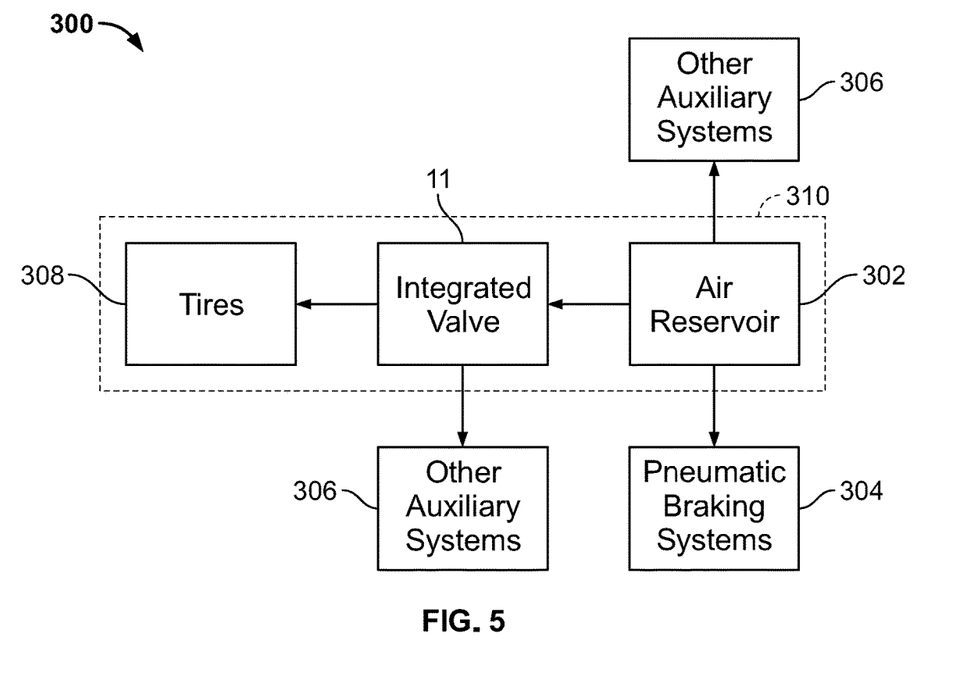
FIG. 5 is a simplified diagram of a pneumatic system for a vehicle.

A simplified diagram of pneumatic system 300 for a vehicle is depicted in FIG. 4. The pneumatic system 300 generally includes an air reservoir 302 for providing pressurized air to a number of components and/or systems coupled to the vehicle. For example, the air reservoir 302 provides air to a primary system 304, which is generally a pneumatic braking system. The air reservoir 302 may also provide air to an integrated tire inflation valve 11, as detailed herein, and optionally to one or more auxiliary systems 306. Optionally, the integrated tire inflation valve 11 may provide air to one or more auxiliary systems 306. As further seen in FIG. 4, the integrated tire inflation valve 11 provides pressurized air to tires 308 of the vehicle for inflation thereof. A tire inflation system 310 may comprise, for example, the integrated tire inflation valve 11, optionally the air reservoir 302, the tires 308, and/or any tubing, conduits, or other components connecting the valve 11, the air reservoir 302, and the tires 308. The air reservoir 302 is generally coupled to, for example, a bogie of a vehicle, for example, a trailer. The integrated tire inflation valve 11 is either connected directly to the air reservoir 302 or through tubing or any other suitable conduit, and the vehicle tires 308 are in fluid communication with the integrated tire inflation valve 11 through tubing or any other suitable conduit.

Figure 1:
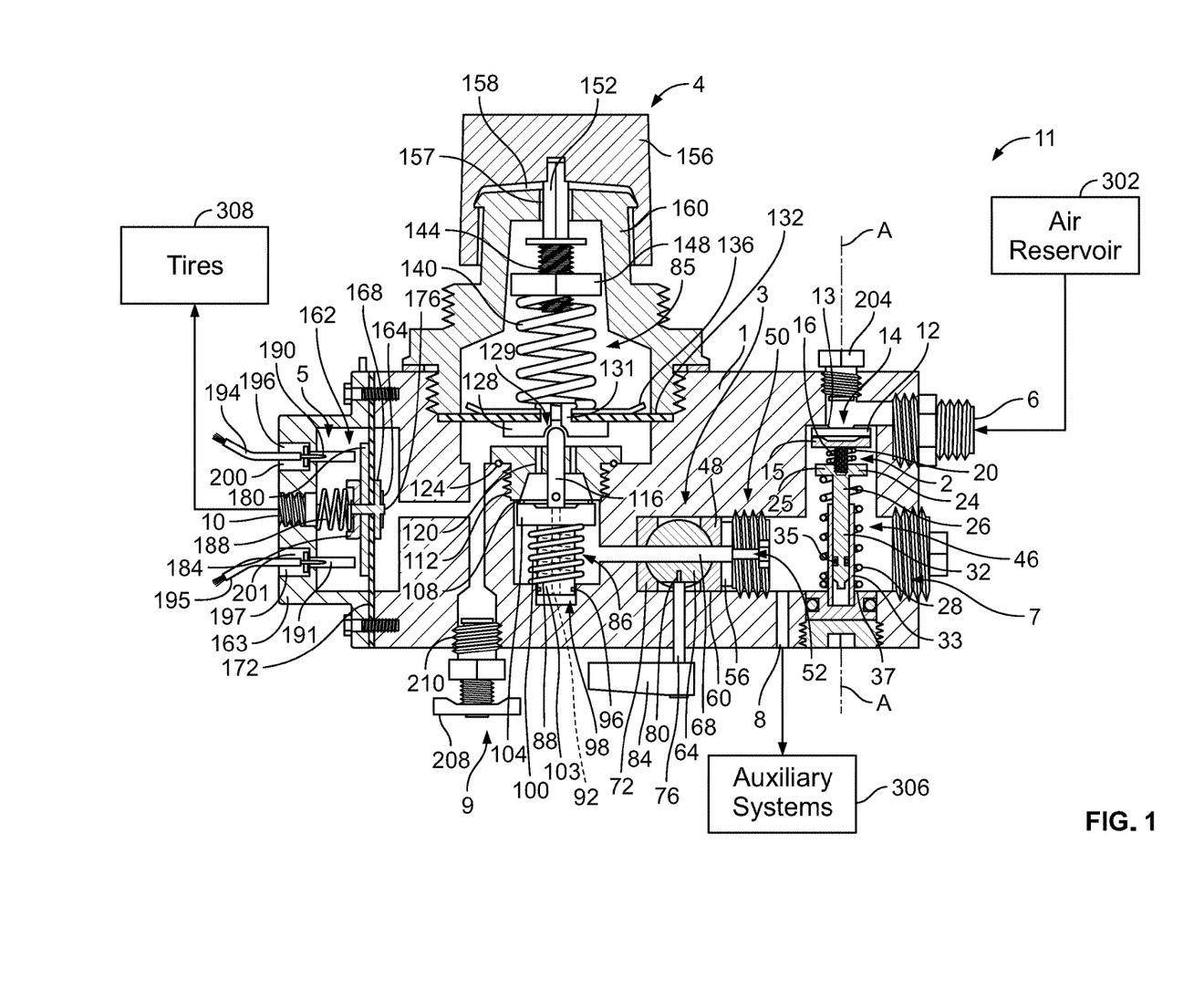
FIG. 1 is a cross-sectional view of an embodiment of an integrated tire inflation valve within a tire inflation system of a vehicle.

A first embodiment of an integrated tire inflation valve 11 is shown in FIG. 1 and generally provides air for inflation of vehicle tires 308 when the pressure in one or more tires is below a threshold level, as will be discussed in greater detail below. The integrated tire inflation valve 11 is one component of an overall tire inflation system 310 for a vehicle. The integrated tire inflation valve 11 generally includes a housing 1 comprising a pressure protection assembly 2, a valve assembly 3, a regulator 4, a flow switch 5, and a plurality of openings. The openings in the housing may include an inlet 6, an installation opening or channel 7, an auxiliary opening or channel 8, a relief opening or channel 9, and an outlet 10, and/or any other suitable openings or channels.

Referring to FIG. 1, the pressure protection assembly 2 generally isolates an auxiliary system, for example, the tire inflation system 310 and/or integrated tire inflation valve 11 from the primary system, for example, the pneumatic braking system 304. In this manner, if an issue (e.g., an error, broken component, failure, etc.) arises in the auxiliary system (tire inflation system 310 and/or integrated tire inflation valve 11), the pneumatic braking system 304 is not compromised.

The pressure protection assembly 2 may include a plurality of components that extend along a central pressure protection axis A. The pressure protection assembly 2 includes a valve seat 12 at a first end of the pressure protection assembly 2. The seat 12 may include a circular sealing face that is configured to be seated against a ledge 13 forming a port 14 such that the seat 12 is configured to close off air communication to the other components of the integrated tire inflation valve 11. The seat 12 may be formed of a flexible material, for example, rubber, a polymeric material, or any other suitable flexible material. The seat 12 is coupled to an end of a guide member 15 that similarly may be circular in cross-section. The guide member 15 is configured to receive a first end of a plunger 16 that may be cylindrical and extends away from the guide member 15 and the seat 12 and through a first spring 20. The first spring 20 surrounds the plunger 16 between the guide member 15 and a second guide member 24 with the plunger 16 slidably received within the second guide member 24. The second guide member 24 includes a first section 25 that may have a generally circular cross-section and which is configured to slidably receive the plunger 16 within a first side thereof and includes a second generally cylindrical section 26 extending away from a second side thereof (and, thus, away from the plunger 16 and the first spring 20). While the guide member 15, the first section 25 of the second guide member 24, and the second section 26 of the second guide member 24 are described as having a circular cross-sections or being cylindrical in shape, such components may have other suitable shapes.

Still referring to FIG. 1, the first section 25 of the second guide member 24 has a first width or a diameter and the second section 26 of the second guide member 24 has a second width or diameter. The width or diameter of the second section 26 is smaller than the width or diameter of the first section 25 of the second guide member 24. The second section 26 of the second guide member 24 extends through a second spring 28 and interfaces with a piston 32. The second spring 28 is configured to wrap around the second section 26 of the second guide member 24, the piston 32, and a cylinder 33. The cylinder 33 is slidingly positioned over an end of the second section 26 with the piston 32 disposed within the cylinder 33 at an end of the second section 26. An O-ring 35 is positioned around the piston 32 to create a seal between the piston 32 and the cylinder 33. The cylinder 33 extends into a third guide member 37, which has a width or diameter that is greater than both the second section 26 of the second guide member 24 and the cylinder 33. The second spring 28 extends between the first section 25 of the second guide member 24 and the third guide member 37. The third guide member 37 may be connected to, embedded within, or integral with an outer wall of the housing 1 (or any other stabilizing component) to stabilize the pressure protection assembly 2. In some embodiments, the second spring 28 has a spring constant, k, or stiffness that is greater than a spring constant, k, or stiffness of the first spring 20. In some embodiments, the second spring 28 has a free length, outer diameter, and/or number of coils that is greater than a free length, outer diameter, and/or number of coils of the first spring 20.

While the overall functionality of the integrated tire inflation valve 11 will be discussed in greater detail below, the pressure protection assembly 2 generally functions to selectively allow a flow of air from the inlet 6 into the integrated tire inflation valve 11 when air through the inlet 6 reaches a particular or pre-set pressure level, for example, about 70 psi, thereby isolating the braking system of a vehicle in which the integrated tire inflation valve 11 is installed from other auxiliary systems. The pressure protection assembly 2 in FIG. 1 is shown in a closed position. When the pressure of the air through the inlet 6 is over the pre-set pressure level, the air overcomes the force of the first and second springs 20, 28 and pushes the seat 12 away from the ledge 13 to open the port 14 and thereby allow a flow of air past the seat 12 and into a cavity 46 in which the pressure protection assembly 2 is positioned. Air thereafter flows into the valve assembly 3, which will be discussed in greater detail below. Conversely, when the pressure of the air through the inlet 6 is not above the pre-set pressure level or the internal pressure of the integrated tire inflation valve exceeds the pressure through the inlet 6, the seat 12 remains seated against the ledge 13, preventing air flow past the pressure protection assembly 2.

Still further, while a particular pressure protection assembly 2 is depicted in FIG. 1, one skilled in the art will understand that any suitable pressure protection assembly may be utilized within the disclosed integrated tire inflation valve 11, so long as the pressure protection assembly provides the necessary pressure protection.

The auxiliary opening or channel 8, as seen in FIG. 1, may be positioned between the pressure protection assembly 2 and the valve assembly 3. The auxiliary opening or channel 8 is optional and may be connected to auxiliary systems, for example, an air suspension system or any other suitable auxiliary system requiring pressurized air.

Referring again to FIG. 1, the valve assembly 3 generally functions to disconnect the integrated tire inflation valve 11 from the air reservoir 302, thus disabling the tire inflation system 310. The valve assembly 3 generally includes a plug 48 positioned within a channel 50 that is in fluid communication with the cavity 46. An outer peripheral surface of the plug 48 and an inner surface(s) of the channel 50 may be threaded or barbed to retain the plug 48 in position within the channel 50. The plug 48 may be generally cylindrical and includes a channel 52 through a center thereof. The channel 52 may include a first portion that is wider than a second portion of the channel 52 to regulate air flow into the valve assembly 3. An inner edge of the plug 48 interfaces with a washer 56 that may be circular and may be made of a flexible material. The washer 56 may have an opening through a center thereof for flow of air. The washer 56 interfaces with a first valve body seat 60 that may be rigid and may have a circular cross-sectional shape. The first valve body seat 60 may have an opening through a center thereof and may be made of plastic, metal, ceramic, or any other suitable material. The first valve body seat 60 may be configured to receive the valve member 64.

In some embodiments, the valve member 64 may be a ball valve. In other embodiments, the valve member 64 may be a quarter turn valve, a half turn valve, a butterfly valve, a knife valve, a gate valve, or any other valve. The valve member 64 is positioned between the first valve body seat 60 and a second valve body seat 72 with each of the valve body seats 60, 72 applying an inward pressure on the valve member 64. The second valve body seat 72 may be rigid and may also have a circular cross-sectional shape. The second valve body seat 72 may have an opening through a center thereof and may be made of plastic, metal, ceramic, or any other suitable material.

In illustrative embodiments, the valve member 64 is configured to receive a drive arm 76 and a drive arm screw 80, which is configured to fix the drive arm 76 to the valve member 64. In other embodiments, the drive arm 76 may be integral with the valve member 64. The drive arm 76 is connected to a control arm 84. The drive arm 76, drive arm screw 80, and control arm 84 provide a manual mechanism for opening and closing the valve member 64. In other illustrative embodiments, any suitable manual mechanism for opening and closing the valve member 64 may be utilized. In still other illustrative embodiments, an automatic or remote-controlled mechanism for controlling the valve member 64 may be utilized.

The valve assembly 3 is installed in the channel 50 within the housing 1 of the integrated tire inflation valve 11. In illustrative embodiments, the valve assembly 3 may be installed perpendicular to the pressure protection assembly 2. In other illustrative embodiments, the valve assembly 3 may be installed parallel to or at any suitable angle with respect to the pressure protection assembly 2. The plug 48 may be screwed or pressed into the channel 50 such that the threads or barbs on the outer surface of the plug 48 engage threads or barbs on the inner walls of the channel 50 to retain the plug 48 in position and apply an appropriate amount of pressure on the valve member 64. The washer 56 may be flexible and can expand or compress based on the location of the plug 48. When the plug 48 is properly positioned, the entire valve assembly 3 is compressed such that the first and second valve set bodies 60, 72 apply an appropriate amount of pressure against the valve member 64 to retain the valve member 64 in position.

When the valve member 64 is arranged in a closed position (using the control arm 84, for example), air flow from the pressure protection assembly 2 is not allowed to flow through the valve member 64 and into the other components of the integrated tire inflation valve 11 (or to the vehicles tires 308). When the valve member 64 is arranged in an open position, as seen in FIG. 1, (using the control arm 84, for example), air is allowed to flow from the pressure protection assembly 2, through the valve assembly 3 via the openings in the plug 48, the washer 56, the valve body seats 60, 72, and the valve member 64, and into the regulator 4, as will be discussed below. The valve assembly 3 allows a user to shut off air flow to the regulator 4 and other components of the integrated tire inflation valve 11, for example, during a troubleshooting or maintenance operation. In this manner, the valve assembly 3 allows for selective isolation of the integrated tire inflation valve 11. While a specific valve assembly 3 is disclosed with particularity, one skilled in the art will understand that any suitable valve assembly 3 may be utilized.

As seen in FIG. 1, the regulator 4 is positioned between and in fluid communication with the valve assembly 3 and the flow switch 5 and generally operates to regulate an amount of air or gas moving through the system and to the vehicle tires 308. The regulator 4 is further positioned within upper and lower chambers 85, 86 within the housing 1. The regulator 4 generally includes a cylinder 88 having a lower member 103 and an upper member 104 positioned within the lower chamber 86. The lower member 103 and the upper member 104 may be circular in cross-section and the lower member 103 may have a diameter that is less than a diameter of the upper member 104. An O-ring 96 may be positioned around a lower end of the lower member 103 of the cylinder 88, wherein the O-ring 96 is positioned between the lower member 103 and a wall forming a cavity 98 within the housing 1. The O-ring 96 and cavity 98 at least partially retain the cylinder 88 in position within the lower chamber 86. A hollow inner channel 92 may extend along a length of the cylinder 88 to provide an air flow path therethrough. A first regulator spring 100 surrounds the lower member 103 of the cylinder 88 and is sandwiched between the upper member 104 of the cylinder 88 and a wall surrounding the cavity 98. A hollow stem 116 is in fluid communication with the channel 92 through the lower member 103, the function of which will be described in detail below.

An O-ring 108 is positioned adjacent an upper surface of the upper member 104 of the cylinder 88, wherein the upper member 104 is forced against a regulator body 112 by the first regulator spring 100. The regulator body 112 engages a wall forming the lower chamber 86 to partially enclose the lower chamber 86. The regulator body 112 may have a generally cylindrical lower body and a generally cylindrical upper body. The lower body of the regulator body 112 may have a threaded or barbed outer surface for engagement with the walls forming the lower chamber 86 and the upper body of the regulator body 112 may extend radially outward from the center of the regulator body 112 further than the lower body of the regulator body 112. The regulator body 112 may have a hollow inner chamber and one or more ports 120 that allow fluid communication between the upper and lower chambers 85, 86. An O-ring 124 may be positioned between the upper body of the regulator body 112 and a wall forming the upper chamber 86 to create a fluid-tight seal therebetween.

Referring again to FIG. 1, the regulator 4 further includes first and second diaphragm discs 128, 136 spaced from one another and joined by a connecting member 131 to form a gap between the diaphragm discs 128, 136. The diaphragm discs 128, 136 generally have a circular shape and are positioned within the upper chamber 85. The first diaphragm disc 128 includes an opening 129 through a center thereof that is configured to selectively engage the stem 116, as will be discussed in greater detail below. A diaphragm 132 extends from walls forming the upper chamber 85 and is positioned within the gap formed by the first and second diaphragm discs 128, 136. A second regulator spring 140 extends between the second diaphragm disc 136 and a nut 148, which is threaded onto a screw 144. The screw 144 may have a square head 152 that is integral with the screw 144. A regulator dial 156 engages the square head 152 of the screw 144 to allow a user to regulate an amount of air through the regulator 4. The regulator 4 may also include a regulator housing 160, which may be integral with the housing 1.

The regulator 4 may have an open position and a closed position. In the closed position, as seen in FIG. 1, the upper member 104 of the cylinder 88 is pressed against the regulator body 112 by the first regulator spring 100 and airflow between the upper member 104 and the regulator body 112 is prevented by a seal formed by the o-ring 108. In the closed position, a small amount of air is allowed to pass through the channel 92 extending through the cylinder 88 and the hollow stem 116.

The regulator 4 is opened when the upper member 104 of the cylinder 88 is pushed out of contact with the regulator body 112. More particularly, when the regulator dial 156 is turned in a first direction, the screw 144 rotates and presses the nut 148 inwardly against the second regulator spring 140, thereby compressing the second regulator spring 140. Conversely, when the regulator dial 156 is turned in a second, opposite direction, the screw 144 is rotated in the opposite direction, causing the nut 148 to apply less pressure to the second regulator spring 140. The adjustment of the regulator dial 156 allows the adjustment of the compressive force applied to the second regulator spring 140.

The compressive force applied to the second regulator spring 140 is translated to a compressive force onto the first diaphragm disc 128, the second diaphragm disc 136, and the diaphragm 132, thereby adjusting a position of such components. For example, when the compressive force on the second regulator spring 140 is increased, the first diaphragm disc 128, the second diaphragm disc 136, and the diaphragm 132 are forced toward the regulator body 112 and into engagement with the stem 116. The force applied to the stem 116 by the first diaphragm disc 128 forces the stem 116 to move against the bias of the first regulator spring 100, thereby moving the upper member 104 away from the regulator body 112 and allowing air to flow around the cylinder 88 and through the ports 120 in the regulator body 112. The more compressive force that is applied to the second regulator spring 140 through the nut 148 and the regulator dial 156, the more the first regulator spring 100 is compressed and the more air that is allowed to flow through the regulator body 112. In illustrative embodiments, it is possible that the regulator 4 is adjusted enough that the first diaphragm disc 28 is forced against the regulator body 112. In this situation, air flowing through the channel 92 in the cylinder 88 would be vented into the upper chamber 85 and out into the atmosphere through a passageway 157 adjacent the screw 144 and a passage 158 between the regulator dial 156 and the regulator housing 160.

In some embodiments, the regulator 4 may be installed in the housing 1 generally perpendicular to the valve assembly 3 and parallel to the pressure protection assembly 2. In other embodiments, the regulator 4 may be installed in the housing 1 in any suitable configuration and at any angle (or parallel with) any of the other components.

One skilled in the art would appreciate that, although one embodiment of a pressure regulator 4 is described herein, any suitable pressure regulation means could be used in any of the integrated tire inflation valves disclosed herein.

As again seen in FIG. 1, the relief opening 9 is positioned between and in fluid communication with the regulator 4 and the flow switch 5. The relief opening 9 operates to selectively exhaust air or gas from the system to atmosphere. The relief opening 9 may have a relief dial 208 that can turn to selectively open and close the relief opening 9. Turning the relief dial 208 to close the relief opening 9 prevents the passage of air or gas through the relief opening 9. Turning the relief dial 208 to an open position allows air or gas to pass through the relief opening 9, thereby relieving pressure in the integrated tire inflation valve 11. The relief dial 208 allows for infinite adjustment in the open position. In a non-limiting example, the relief dial 208 may achieve infinite adjustability by operating on a screw mechanism in which the screw mechanism translates the turning of the relief dial 208 into translation of a plug 210 into or out of the relief opening 9 along the threads of the screw mechanism. While a particular relief opening 9 and adjustment mechanism 208 are depicted, any suitable relief opening or openings and/or adjustment mechanism may be utilized.

Referring again to FIG. 1, the flow switch 5 generally operates to provide an indication to, for example, a drive of the vehicle that the vehicle tires 308 are being inflated. The flow switch 5 is generally positioned in a chamber 162 formed between a cover 163 and a portion of the housing 1 of the integrated tire inflation valve 11. The cover 163 is made of a non-conductive material, for example, plastic, and is attached to the housing 1 by screws or any other suitable fastener. The flow switch 5 generally includes a diaphragm 172 that is sandwiched between the cover 163 and the housing 1 such that the diaphragm 172 extends through the chamber 162. A disc 168 and an O-ring 164 are secured to a first, inner side of the diaphragm 172, wherein each includes an opening through a center thereof. A second, metal disc 180 is secured to a second or outer side of the diaphragm 172 and includes an opening through a center thereof. A support member 184 is secured to a side of the second disc 180 opposite the diaphragm 172. The support member 184 may include an opening therethrough and may include outturned edges that form a cavity for retaining a flow switch spring 188 between the supper member 184 and an inner surface of the cover 163. The openings extending through the disc 168, the diaphragm 172, the second disc 180, and the support member 184 are in fluid communication with one another to allow air flow through the flow switch 5.

Air or gas passes from the housing 1 to one or more vehicle tires 308 through the outlet 10. This occurs when a pressure in the integrated tire inflation valve 11 is greater than a pressure in the vehicles tires 308 (thereby indicating there is a low pressure condition in the tires 308). This pressure difference may be as low as, for example, 2 psi. When this pressure difference occurs, the regulator 4 begins to open, as detailed above, thereby allowing air to flow through the regulator 4 to the flow switch 5.

As the air flows through the flow switch 5, the pressure of the air pushes against the flow switch 5, thereby applying a compressive force on the flow switch spring 188. The compressive force applied to the flow switch spring 188 allows translation of the second disc 180 which engages the contacts 190, 191. Engagement between the contacts 190, 191 and the second disc 180 creates an electrical connection between the second disc 180, the contacts 190, 191, and the leads 194, 195. In illustrative embodiments, one of the leads 190, 191 may be connected to an indicator that is, for example, illuminated to indicate that one or more tires is being inflated. Optionally, any other suitable indication mechanism may be utilized, for example, lights, vehicle control displays, or audible indications.

Air flows through the regulator 4 and the flow switch 5 until the pressure between the regulator 4 and the vehicles tires 308 is balanced, which causes the regulator 4 to again close. When the regulator is closed, no air flows through the flow switch 5 to the vehicle tires 308. In this manner, the switch spring 188 is not compressed and, thus, the second disc 180 is not in engagement with the contacts 190, 191 and the indicator is not illuminated.

Referring to FIG. 1, the contacts 190 and 191 extend through the cover 163 and into the chamber 162, as seen in FIG. 1. The second disc 180 may be selectively moved (together with the diaphragm 172 against the bias of the flow switch spring 188 into contact with the contacts 190, 191). In illustrative embodiments, the contacts 190, 191 are molded into the cover 163 and include leads 194 and 195 extending away from the contacts 190, 191 and the housing 1. The leads 194, 195 may be fixed to the contacts 190, 191 by soldering, plugs, or other suitable connection(s).

During manufacture of the cover 163, for example, the contacts 190, 191 may be placed within a mold used to create the cover 163 and, thereafter, material to form the cover 163 may be added to the mold to thereby encase the contacts 190, 191 within the mold. As seen in FIG. 1, the contacts 190, 191 may be formed within cavities 196, 197, the leads 194, 195 may be connected to the contacts 190, 191, respectively, and an epoxy resin may be inserted into the cavities 196, 197 to fill or partially fill the cavities 196, 197 and electrically isolate the contacts 190, 191 from the external environment. This sealing of the contacts 190, 191 and the leads 194, 195 and use of a non-conductive cover 163 may reduce the possibility of corrosion and/or damage to the leads 194, 195, thus potentially increasing the life of the system 11.

The operation of the integrated tire inflation valve 11 will now be discussed in detail with respect to FIG. 1. In illustrative embodiments, the integrated tire inflation valve 11 is provided air through a pneumatic source, such as the air reservoir 302 (i.e., compressed air tank). In other illustrative embodiments, any other suitable source of air may be utilized. The air reservoir 302 is connected to the inlet 6 of the housing 1. The inlet 6 of the housing is in fluid communication with the port 14 and, through the port 14, the pressure protection assembly 2. As noted above, when the air pressure through the inlet 6 is less than a pre-set pressure, no air enters the integrated tire inflation valve 11. Conversely, when the air pressure through the inlet 6 is greater than the pre-set pressure, the pressurized air overcomes the bias of the first and second springs 20, 28 of the pressure protection assembly 2. More particularly, the pressurized air forces the seat 12 away from the port 14, thereby compressing the first spring 20 and applying a compressive force on the plunger 16, which, in turn, applies a compressive force to the second guide member 24, which compresses the second spring 28, and translates the piston 32 within the cylinder 33.

The second guide member 24 may not translate when the plunger 16 initially presses against the second guide member 24 dependent upon the force pressing against the second guide member 24 by the second spring 28. This is due to the second spring 28 being larger and having a larger spring constant, k, than the first spring 20. A non-limiting example of a pressure large enough to cause compression of the first spring 20 is about 5 psi and a pressure large enough to cause compression of the second spring 28 is about 70 psi. When this occurs, the second guide member 24 compresses the first and second springs 20, 28 and applies a force to the piston 32 thereby translating the piston 32 within the cylinder 33. The seat 12 is coincidently translated away from the ledge 13, thereby allowing air or gas to pass into the pressure protection assembly 2. In illustrative embodiments, the first spring 20 may also act as a check valve.

As noted above, the pressure protection assembly 2 remains in the closed position unless sufficient pressure is applied to the seat 12 from the air reservoir 302. The pressure protection assembly 2 will enter a closed position in the absence of pressure from the air reservoir 302. The pressure protection assembly 2 will also close in the event that reverse pressure is applied on the seat 12. In this case, the reverse pressure will force the seat 12 against the ledge 13, thereby closing the pressure protection assembly 2.

In some embodiments, the pressure protection assembly 2 is designed to isolate a vehicle's braking system from other auxiliary systems, such as air ride systems. Isolation of the braking system may be accomplished by positioning the outlet of the braking system prior to the inlet 6 and the seat 12 of the pressure protection assembly 2 and connecting the braking system to the air reservoir 302. In this case, if any reverse pressure were to occur in the integrated tire inflation valve 11, the braking system would be isolated because the seat 12 would move to the closed position.

When the pressure protection assembly 2 is in an open position, the inlet, the valve assembly 3, and the auxiliary opening 86 are in fluid communication with one another. In some embodiments, the auxiliary opening 8 may be capped and closed. In other embodiments, the auxiliary opening 8 may be open and connected to other pneumatic vehicle systems.

Assuming the valve assembly 3 is also in the open position, air flows in through the inlet 6, the pressure protection assembly 2, through the valve assembly 3, and into the regulator 4. In this scenario, pressurized gas or air enters the chamber 86 surrounding the cylinder 88 and the first regulator spring 100. The pressure set by the regulator dial 156 will determine when air is to be added to one or more vehicle tires 308. As noted above, a pressure difference (e.g., as small as 2 psi) in which the pressure in the integrated tire inflation valve 11 is greater than the pressure in one or more tires causes the regulator 4 to open, causing air to pass through the flow switch to one or more tires 308. More particularly, as a pressure in the tires drops, the low pressure causes the regulator 4 to open, thereby providing air to the vehicle tires 308. At the same time, the air pressure causes outward movement of the diaphragm 172, which applies a compressive force on the flow switch spring 188, thereby moving the second disc 180 into contact with the contacts 190, 191 (which illuminates the indicator).

Figure 2:
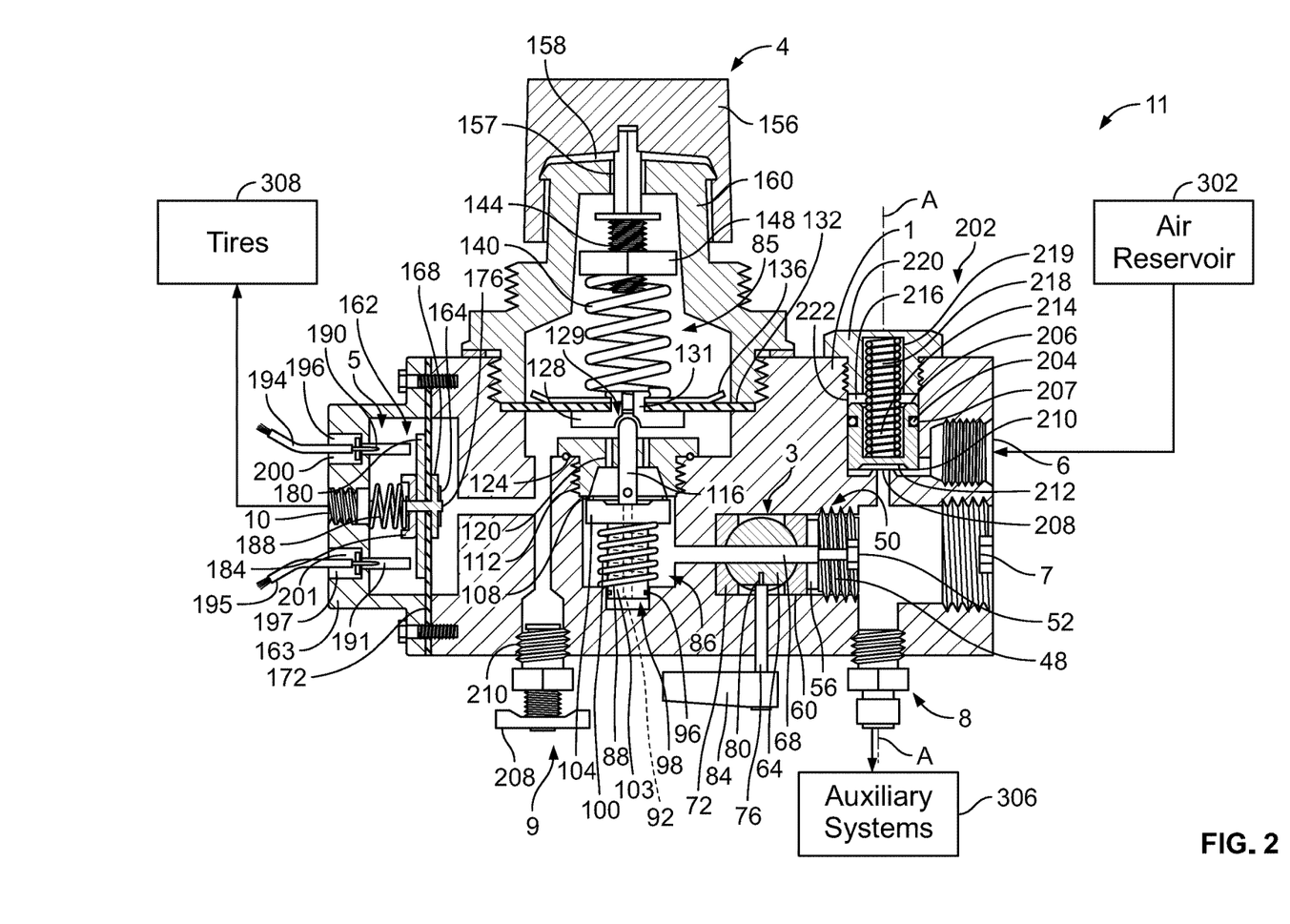
FIG. 2 is a cross-sectional view of an additional embodiment of an integrated tire inflation valve within a tire inflation system of a vehicle.

An additional embodiment of an integrated tire inflation valve 11 is shown in FIG. 2. The integrated tire inflation valve 11 shown in FIG. 2 is identical to the integrated tire inflation valve 11 shown in FIG. 1 with the exception of the pressure protection assembly 2. All other components of the integrated tire inflation valve 11 are the same in FIGS. 1 and 2 and, thus, are numbered accordingly.

The pressure protection assembly 202 of FIG. 2 includes a guide member 204 positioned within a cavity 206 in the housing 1 with an O-ring 207 forming a fluid-tight seal between an outer surface of the guide member 204 and walls forming the cavity 206. A valve seat 208 is disposed at a first end 210 of the guide member 204 and is configured to abut a port 212 within the housing 1. A hollow inner chamber 214 is formed in a second end 216 of the guide member 204 and a first end of a pressure protection spring 218 is positioned within the hollow inner chamber 214. A second end of the pressure protection spring 218 extends into a hollow inner chamber 219 of a pressure protection cap 220, which is spaced from the guide member 14 by a gap 222. The pressure protection cap 220 may have a threaded or barbed outer surface that may be screwed or pressed into the housing 1.

In some embodiments, the seat 208 is pressed against a ledge forming the port 212 between the inlet 6 and the valve assembly 3 by the pressure protection spring 218. More particularly, the pressure protection spring 218 applies a pre-set force (determined by the spring constant, k, of the pressure protection spring 218) to the seat 208, which holds the seat 208 in a closed position against the ledge forming the port 212. In the closed position, air or gas cannot pass the seat 12. When air at a pressure above a pre-set limit enters the inlet 6, the pressurized air overcomes the force of the pressure protection spring 218 and forces the seat 208 away from the ledge forming the port 212, thereby opening the port 212. In other words, the seat 12 remains pressed against the ledge until the pressure applied by the pneumatic source 300 overcomes the force applied to the seat 208 by the pressure protection spring 218. A non-limiting example of a pressure required to overcome the force applied to the seat 208 by the pressure protection spring 218 may be 70 psi.

Figure 3:
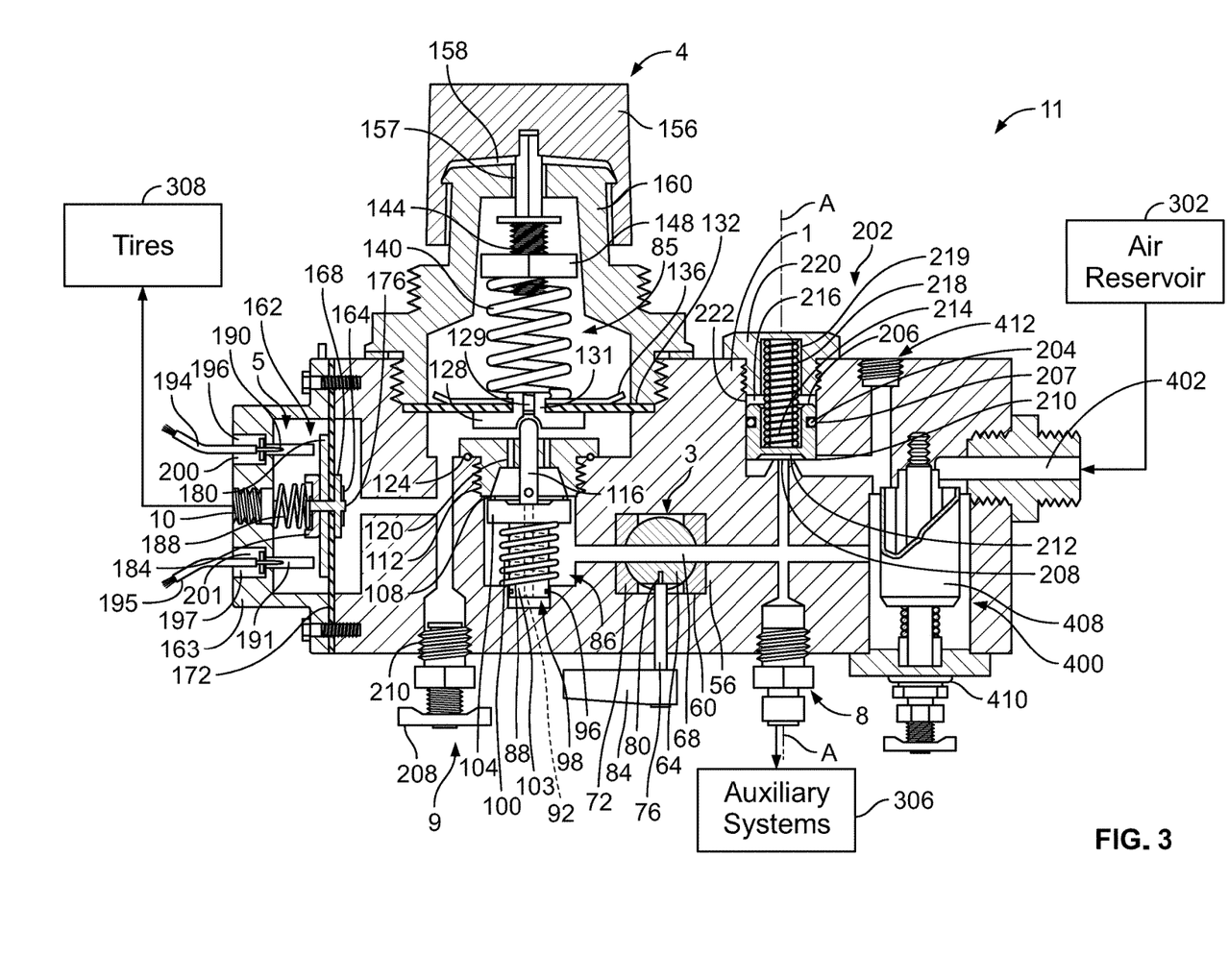
FIG. 3 is a cross-sectional view of a further embodiment of an integrated tire inflation valve with within a tire inflation system of a vehicle, the integrated tire inflation valve further including a filter.

Another embodiment of an integrated tire inflation valve 11 is shown in FIG. 3. The integrated tire inflation valve 11 shown in FIG. 3 is identical to the integrated tire inflation valve 11 shown in FIG. 2 with the exception for the addition of a filter assembly 400. All other components of the integrated tire inflation valve 11 are the same in FIGS. 2 and 3 and, thus, are numbered accordingly.

The filter assembly 400 of FIG. 3, is located upstream or prior to (when considering the flow of air through the integrated tire inflation valve 11) of the pressure protection assembly 2. An inlet 402 provides air from the air reservoir 302 in the same manner as described above to the filter assembly 400. In some embodiments, the filter assembly 400 is positioned within a cavity 404 in fluid communication with the pressure protection assembly 2, the auxiliary opening or channel 8, and/or the valve assembly 5 through appropriate conduits. In other embodiments, the filter assembly 400 may only be in fluid communication with the pressure protection assembly 2.

The filter assembly 400 includes a filter 408 that functions to remove contaminants/debris and/or moisture from the air entering the inlet 402, thereby reducing the contaminants/debris and/or moisture provided to the tires 308 and/or other auxiliary systems 306, which may function to reduce issues or errors with the integrated tire inflation valve 11. The filter 408 may be any suitable filter configured to filter air. In some embodiments, the filter 408 may include a shaft 410, which is attached to walls forming the cavity 404 by a bolt or other attachment mechanism. In other embodiments, the filter 408 may be positioned within and/or attached to walls forming the cavity 404 in any suitable manner.

As seen in FIG. 3, the filter assembly 400 may also include a moisture drain 410 that allows moisture collected by the filter 408 to be drained from the integrated tire inflation valve 11 in any suitable manner. In some embodiments, the filter assembly 400 may also include an access plug 412 for connecting to auxiliary systems 306 or for any other suitable function or access to the integrated tire inflation valve.

While the filter assembly 400 is shown as being within the housing 1 of the integrated tire inflation valve 11 (i.e., integral with the integrated tire inflation valve 11), it is within the scope of the present invention to provide a filter assembly that is separate from the integrated tire inflation valve 11 and between the air reservoir 302 and the integrated tire inflation valve 11.

FIG. 4 shows an embodiment of the flow switch 5. The flow switch 5 shown in FIG. 3 can be identical to the flow switch 5 seen in FIG. 1 and FIG. 2 with the exception of the leads 194, 195 being connected to an AMP 2 pin connector 210, which is a typical electrical connector used in trailers. The AMP 2 pin connector 210 may then be electrically coupled to an indicator on the vehicle.

The systems disclosed herein may include any number of sensors or indicators (e.g., the indicator that indicates when one or more tires are being inflated) for determining the status of various functions or features of the integrated tire inflation valve 11 and/or other systems in communication with the integrated tire inflation valve 11. For example, the sensors and/or indicators may determine and/or indicate whether the tires are being inflated, whether there are issues with one or more tires, whether air is or is not properly being communicated to the integrated tire inflation valve 11, whether one or more components of the tire inflation valve 11 are malfunctioning, and/or any other functions or features of the integrated tire inflation valve 11, the pneumatic system 300, or the systems in communication with the integrated tire inflation valve 11. In this manner, monitoring and diagnostics may be provided to the integrated tire inflation valve 11, the pneumatic system 300, or other systems in communication with the integrated tire inflation valve 11. In some embodiments, the results of the monitoring and diagnostics may be ready locally, for example, at the integrated tire inflation valve 11 with, for example, a diagnostics tool or reader. Alternatively or in addition, the integrated tire inflation valve 11 may be coupled to a trailer monitoring system such that the results of the monitoring and diagnostics may be sent to a trailer monitoring system. Still alternatively or in addition, the results of the monitoring and diagnostics may be sent, for example, by any suitable wireless communication device and/or network, to a remote device, for example, a remote computer system, a mobile device, or any other remote device.

As noted above, the integrated tire inflation valves 11 disclosed herein include the pressure protection assembly 2, the valve assembly 3, the regulator 4, the flow switch 5, and a plurality of openings. The systems 11 integrate these components into a single housing 1, which reduces the number of parts, simplifies installation, decreases the overall cost of the systems, allows for monitoring of tire pressure, and protects the air braking system against auxiliary air system failure. Additionally, since the components of the systems are all in one location, the components are more readily accessible. In this manner, monitoring of the systems is easier, thereby make tire inflation and diagnostics monitoring easier.

Prior art systems also generally utilize multiple separate components connected to one another by flow connectors (i.e., separate conduits). Every point of connection between these separate components and the flow connectors is a point of potential leakage. Incorporating these components into a single housing may reduce the number of points for potential leakage, thereby potentially reducing maintenance on the system and potentially increasing the life span of the system.

While not depicted in the figures, the integrated tire inflation valves of the present disclosure may include any other suitable features or components. In one illustrative embodiment, an integrated tire inflation valve may include a filter and/or moisture eliminator positioned at the inlet 6 of the integrated tire inflation valve 11.

While the integrated tire inflation valves as disclosed herein are discussed as being used with a semi-tractor trailer, the integrated tire inflation valves may be used with any truck body, dry van, refrigerated trailer, refrigerated dry van, flat bed, tank trailer, or any other vehicles.

While directional terminology, such as top, bottom, upper, lower, left, right, etc., may be utilized herein, such terminology is simply intended to indicate the position of different components in relation to one another as seen in the orientation in the figures and is not intended to be limiting. One skilled in the art will understand that the integrated tire inflation valve may be positioned in any orientation. Further, the orientation and position of the components of the integrated tire inflation valves herein are for illustrative purposes only. Any of the components of the integrated tire inflation valve may be located at any position and at any orientation (e.g., at different angles, in different planes than, etc.) with respect to the other components, as long as the components are fluidly coupled as depicted in the figures.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An integrated tire inflation valve comprising:
    an inlet configured to receive air from an air reservoir;
    a pressure protection assembly configured to control air flow into the integrated tire inflation valve when an air pressure reaches a pre-set pressure level;
    a valve assembly in fluid communication with the pressure protection assembly, the valve assembly having open and closed positions;
    a pressure regulator configured to be adjusted to a desired pressure to thereby allow air through the pressure regulator at a desired level;
    a flow switch configured to selectively allow air therethrough; and
    an outlet configured to provide air from the flow switch to one or more tires of a vehicle;
    wherein the inlet, pressure protection assembly, valve assembly, pressure regulator, flow switch, and outlet are all positioned within a single housing.

2. The integrated tire inflation valve of claim 1, wherein the pressure protection assembly includes at least one spring that allows for selective engagement of a valve seat against a ledge forming a port.

3. The integrated tire inflation valve of claim 2, wherein the pressure protection assembly remains in a closed position when a pressure through the inlet is insufficient to overcome a force applied to the valve seat by the spring.

4. The integrated tire inflation valve of claim 2, wherein the pressure protection assembly moves to an open position when a pressure of the air through the inlet is sufficient to overcome a force applied to the valve seat by the spring, thereby disengaging the valve seat from the ledge and opening the port.

5. The integrated tire inflation valve of claim 1, wherein the pressure protection assembly is configured to isolate the integrated tire inflation valve from other pneumatic-based vehicle systems.

6. The integrated tire inflation valve of claim 1, wherein the valve assembly is a ball valve.

7. The integrated tire inflation valve of claim 1, further including a filter assembly positioned between the inlet and the pressure protection assembly, the filter assembly comprising a filter positioned in a cavity within the single housing, the filter configured to remove contaminants and moisture from air flowing through the cavity.

8. The integrated tire inflation valve of claim 1, wherein the flow switch is configured to allow pneumatic communication between the integrated tire inflation valve and one or more tires through the outlet.

9. The integrated tire inflation valve of claim 1, wherein a metallic plate of the flow switch is configured to contact contacts of the flow switch to provide an electrical connection therebetween.

10. The integrated tire inflation valve of claim 1, wherein a relief opening is positioned between the pressure regulator and the flow switch, wherein the relief opening is configured to relieve pressure in the integrated tire inflation valve.

11. The integrated tire inflation valve of claim 1, wherein an auxiliary opening is positioned between the pressure protection assembly and the valve assembly to allow fluid communication with other vehicle systems.

12. The integrated tire inflation valve of claim 1, wherein the flow switch comprises:
    a diaphragm sandwiched between a cover and the housing;
    at least one contact molded into the cover; and
    a lead extending from the at least one contact.

13. The integrated tire inflation valve of claim 12, wherein the flow switch further comprises:
    a metal plate positioned adjacent the diaphragm on a side of the diaphragm facing the cover; and
    a spring positioned between the metal plate and the cover to bias the metal plate and the diaphragm and the cover;
    wherein the metal plate is selectively engaged with the at least one contact when an air pressure within the flow switch overcomes a bias of the spring.

14. The integrated tire inflation valve of claim 12, wherein the at least one contact is molded within a cavity in the cover, the lead is attached to the at least one contact, and the cavity is filled with epoxy to retain the lead in engagement with the at least one contact and isolate the at least one contact.

15. The integrated tire inflation valve of claim 1, wherein the flow switch comprises:
    a diaphragm sandwiched between a cover and the housing;
    two contacts molded into the cover; and
    a lead extending from each of the two contacts.

16. The integrated tire inflation valve of claim 1, further including an auxiliary portion positioned within the housing and configured to provide air to at least one auxiliary pneumatic system.

17. An integrated tire inflation valve comprising:
    an inlet configured to receive air from an air reservoir;
    a pressure protection assembly configured to allow air into the integrated tire inflation valve when an air pressure reaches a pre-set pressure level;
    a pressure regulator configured to be adjusted to a desired pressure to thereby allow air through the pressure regulator at a desired level;
    a flow switch configured to selectively allow air therethrough; and
    an outlet configured to provide air from the flow switch to one or more tires of a vehicle;

wherein the inlet, pressure protection assembly, pressure regulator, flow switch, and the outlet are positioned within a housing;

wherein the flow switch includes a diaphragm sandwiched between a cover and the housing, the cover being made of a non-conductive material, at least one contact molded into the cover, and a lead extending from the at least one contact.

18. The integrated tire inflation valve of claim 17, further including a filter assembly positioned between the inlet and the pressure protection assembly, the filter assembly comprising a filter positioned in a cavity within the housing, the filter configured to remove contaminants and moisture from air flowing through the cavity.

19. The integrated tire inflation valve of claim 18, wherein the inlet, the filter assembly, the pressure protection assembly, the pressure regulator, the flow switch, and the outlet are all positioned within the housing.

20. The integrated tire inflation valve of claim 19, further including a drain in fluid communication with the cavity, wherein the drain is configured to release moisture that has been collected by the filter.

\* \* \* \* \*